Jan. 24, 1939.  F. W. COTTERMAN  2,144,795
HYDROMECHANICAL TRANSMISSION FOR MOTOR VEHICLES
Filed June 17, 1937  2 Sheets-Sheet 2

Patented Jan. 24, 1939

2,144,795

UNITED STATES PATENT OFFICE 2,144,795

HYDROMECHANICAL TRANSMISSION FOR MOTOR VEHICLES

Frederick W. Cotterman, Dayton, Ohio, assignor of one-half to Bessie D. Apple, Dayton, Ohio Application June 17, 1937, Serial No. 148,751

20 Claims. (Cl. 74—189.5)

This invention relates to power transmission mechanism for connecting a driving and a driven member in variable speed ratio, and particularly to that type of transmission wherein a turbine is combined with toothed gearing to provide a more extended range. It is particularly adapted to automotive use, and comprises a structure somewhat similar to that shown in my copending application, Serial No. 142,464, filed May 13th, 1937.

The hydraulic unit of the mechanism is of the class which operates both as a fluid clutch and a torque multiplying turbine. It comprises an impeller, a rotor in two stages, and a stator between the stages. The impeller or input member is secured to the engine, the rotor being the output member of the unit.

One of the difficulties with a hydraulic unit of this class is that the functions of clutch and torque multiplier are inconsistent, i. e., in a perfect torque multiplier, the lower the output member speed for a given input member speed the greater the torque multiplication, whereas as a clutch it would be desirable if the impeller, when revolving at the engine idling speed of several hundred R. P. M., would impart zero torque to the rotor.

To obviate this difficulty in mechanisms of this class means have been added to restrain the flow of fluid through the impeller by blocking the space between the impeller blades by valves.

These valves are normally closed, but are provided with centrifugal weights which act at a predetermined speed to open the valves. By this means the impeller does not act as an impeller until a considerable engine speed is reached. Below the predetermined speed, therefore, the impeller has better releasing qualities, such as are required of a clutch that is to automatically release when the engine is lowered to its idling speed.

Even when such valves are provided there is still considerable impeller drag on the rotor due to the fact that part of the hydraulic fluid is in the impeller and part in the rotor and there is therefore a tendency for the rotating part of the fluid to adhere to the non-rotating part.

It is therefore an object of this invention to provide a combined hydraulic and geared device of the character described with a brake for holding the rotor stationary against the impeller drag, the brake being operable on and off through a mechanical connection between the impeller valves and the brake, whereby, when the valves open to cause the impeller to become effective to drive the rotor, the brake automatically releases the rotor to be driven, to the end that certain connections which are preferably made to the rotor shaft when it is non-rotative may be effected by bringing the engine to its idling speed.

The gear portion of the mechanism comprises toothed members which must be manually shifted into mesh with each other for forward and reverse gear ratios.

In conventional transmissions a shift into low gear or reverse often is resisted by the fact that the teeth of the members to be meshed have come to rest with the mating teeth misaligned. The practice is then to turn the toothed members slightly by momentarily engaging the clutch, then disengaging it again to cause slight rotation of the toothed members on momentum, then effecting manual engagement of the teeth while this slight relative rotation is taking place.

Inasmuch as such rotation may be had in the mechanism herein shown by momentarily releasing the brake which holds the rotor non-rotative, it is a further object of the invention to provide means which operates by movement of the manual gear shifting mechanism from one position to another to release the rotor brake during the movement between engagement positions, but reapplies the brake as soon as either engagement position is reached, to the end that tooth engagement always will take place while the mating teeth are under slight relative rotation.

In a hydraulic unit of the character shown, the impeller, rotor and stator cannot be so designed as to be efficient as a torque multiplier over a very wide range of speed, the efficiency as a torque multiplier being highest when the relative speeds of the several members are those for which the mechanism was designed. It follows that, for driving a vehicle the maximum speed of which is more than ten times the minimum, a gear set of rather wide ratio changing capacity is desirable.

In view of the limited speed range within which the hydraulic portion of the unit described is efficient, it is a further object of the invention to provide a gear box whereby, rather than pull the hydraulic unit down to a ratio at which it multiplies torque at low efficiency, a step down in the gear box may be made to allow the hydraulic unit to operate at less reduction between the impeller and rotor for the same engine to wheel ratio, with means to effect this step down easily, either when the vehicle is at rest or when it is in motion.

In view of the further fact that the hydraulic unit of the character described is efficient for a greater speed reduction between impeller and rotor when it is not being operated at its maximum capacity, it is a further object of this invention to make the step down connection through the gear box manually operable, whereby, when maximum acceleration, or maximum hill climbing power is not desired, the step down connection need not be made.

In view of the fact that vehicle speeds must vary from 5 to 90 M. P. H., whereas the present internal combustion engines may not be varied efficiently over more than one-fourth of this range, it is a further object of this invention to extend the ratio variation through the mechanism by employing gear means and connections therefor, whereby there may be had through the gearing, an underdrive, a direct drive and an overdrive ratio, one or another of which is at all times in series with the hydraulic unit, which being responsive to both speed and torque, will vary by infinitesimal ratio changes depending on similar variations in the balance as between the power applied and the vehicle resistance interposed thereto.

Another object is to so arrange the gearing and connections therefor as to provide, without the addition of any parts for the purpose, a no-back arrangement whereby neither the rotor nor any part of the gear set may rotate backwardly, except when the manual gear shifting means is set for backward rotation, to the end that a vehicle may hold itself from coasting backwardly down hill without the application of its brakes.

It is a further object of the invention to keep the gear box as compact and inexpensive as possible, and to this end a single gear train, comprising an internal ring gear, a sun gear, and planet pinions, is made by certain connections to provide an overdrive, a direct drive, an underdrive and a reverse ratio, the overdive being controlled by centrifugal means, and the underdrive and reverse by manual means, while direct drive is a normal condition present when neither manual nor centrifugal control is being exercized.

Other objects and advantages will be seen as the invention is described in detail and reference is had to the drawings, wherein.

Construction

Figures 1, 2, 3, 4, 5, 6:
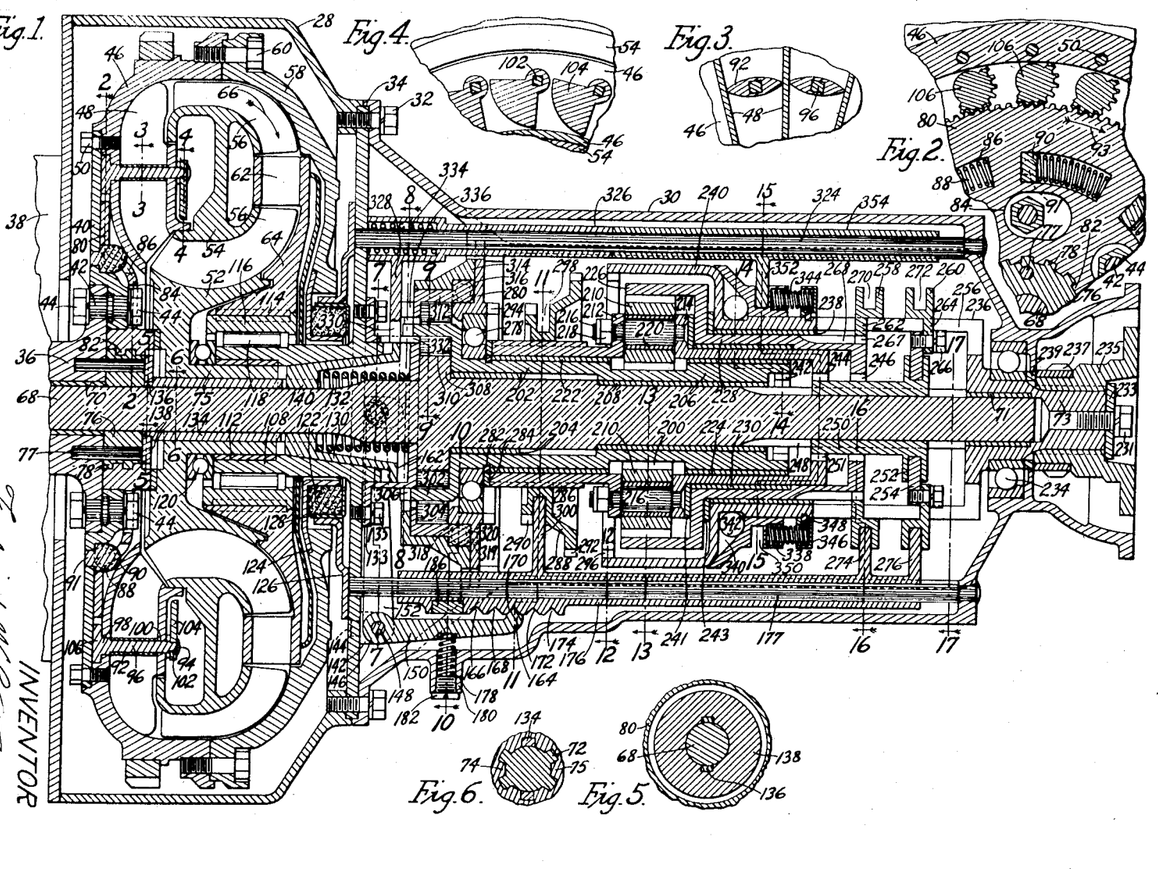
Fig. 1 is a horizontal axial section through the transmission mechanism.
Fig. 2 is a fragmentary section taken at 2—2 of Fig. 1 showing part of the mechanism whereby the impeller valves and the rotor brake are compelled to operate in unison.
Fig. 3 is a fragmentary section taken at 3—3 of Fig. 1 showing several of the impeller blades.
Fig. 4 is a fragmentary section taken at 4—4 of Fig. 1 showing the centrifugal weights for operating the impeller valves and the rotor brake simultaneously.
Fig. 5 is a fragmentary section taken at 5—5 of Fig. 1 showing part of the mechanism for operating the rotor brake.
Fig. 6 is a fragmentary section taken at 6—6 of Fig. 1 showing another part of the mechanism for operating the rotor brake.

The housing provided to contain the mechanism is composed of two sections separated by a partition plate. The forward section 28 contains the hydraulic unit and the rearward section 30 the gear set with the automatic governor for setting the mechanism for overdrive and the manual mechanism for shifting to low and reverse. Screws 32 secure the sections 28 and 30 and the plate 34 together. The mechanism is normally in direct drive.

Within the forward section, the crank shaft 36 of an engine 38 has the impeller plate 40 secured thereto by the bolts 42 and nuts 44. The impeller 46 has blades 48 and is secured to the plate 40 by screws 50.

The rotor comprises a main body 52, a core 54 and blades 56 arranged in two stages. An impeller cover 58 is secured to the impeller 46 by the screws 60. The cover 58 fits as closely around the rotor blades 56 as will permit rotation at different speeds between the two parts.

At the rearward side, the rotor blades 56 and a small section of the core 54 are cut away to admit the stator blades 62. The stator blades 62 are supported on the stator body 64, and are so angled that movement of a fluid between the rotor blades 56, in the direction of the arrow 66, impinges on the stator blades to drive the rotor forward, by forward being meant clockwise when standing at the left of the drawings.

The rotor shaft 68 has rotative bearing at the forward end in the bearing bushing 70 which is press fitted in the crank shaft 36, and at the rearward end in the bearing bushing 71 which is press fitted in the tail shaft 73.

External splines 72, Fig. 6, fit between internal splines 74 of the rotor hub 75 whereby the shaft and rotor always rotate in unison. A collar 76 is fitted to be slidable axially on the shaft 68. Pins 77 press fitted in the collar are slidable in holes in the crank shaft 36 whereby the collar is compelled to rotate with the crank shaft. Collar 76 is provided externally with a coarse pitch thread 78. A gear 80 is internally threaded at 82 to fit over the threads 78 of the collar.

Oblong slots 84 in the gear clear the nuts 44 so that the gear may have slight rotative movement with respect to the plate 40. Arcuate openings 86 through the gear receive the springs 88 and studs 90, the shanks of the studs being riveted in the plate 40 as at 91. The springs 88 always urge the gear 80 in the direction of the arrow 93 with respect to the plate 40.

Between the impeller blades 48 are the butterfly valves 92. The valve stems 94 are squared at 96 where they pass through the valves, rounded at 98 and 100 where they have bearing in the impeller, and squared to a smaller size at 102 where they pass through the centrifugal weights 104. Pinion segments 106 are integral with the stems 94 and are in constant mesh with the gear 80.

A long hub 108 extends forwardly from the partition plate 34. The outside of the rotor hub 75 has rotative bearing in a bushing 112 press fitted into the front end of the hub 108. The stator body 64 is held by a key 114 to the stator hub 116 which is internally formed to receive the combination roller bearing and roller brake 118.

The hub 108 is externally formed for the combined brake and bearing which permits the stator to rotate forwardly but not backwardly.

A thrust bearing 120 holds the rotor in its forward position. A felt seal washer 122 held by retaining members 124, 126 and 128, keeps the hydraulic fluid from leaking out into the housing section 28. At the rearward end the hub 108 is internally tapered to receive the brake cone 130 which is normally held engaged by the spring 132.

A flanged cup 133 fits snugly over the rear end of the hub 108 and is secured to the partition plate 34 by the screws 135. The bottom of the cup 133 on its forward face receives the reaction of the spring 132 while its rearward face limits end movement of the rotor shaft 68.

The external splines 72 of the rotor shaft 68 are spaced as for six splines but two of the splines have been cut away, (see Fig. 6), and the space thus made between internal splines 74 of the rotor hub slidably receive the keys 134. The keys 134 are notched at their front end at 136 and the washer 138 is correspondingly notched to fit over the key ends. The notched ends of the keys are preferably brazed to the washer 138.

The cone 130 has internal splines 140 slidably fitted to the external shaft splines 72 whereby the cone always rotates with the rotor shaft 68. As long therefore as the spring 132 is expanded, the friction of the cone 130 in the tapered end of the hub 108 keeps the rotor 52 and the shaft 68 from rotating.

When, however, the centrifugal weights 104 are caused by sufficient impeller speed to fly out and open the valves 92, the segments 106 turn the internally threaded gear 80, whereupon the externally threaded collar 76 is moved axially rearward against the washer 138 which pushes the slidably fitted keys 134 against the cone 130 and forces it out of contact with the tapered opening in the hub 108. The opening of the valves 92 for making the impeller effective as such, must therefore always occur simultaneously with the freeing of the rotor 52 by the brake cone 130.

On the rearward face of the partition plate 34 are two hinge ears 142. The ears have stems 144 which extend through the plate and are held therein by riveting. A hub 146 is hinged between the ears 142 by the hinge pin 148 (see Fig. 7). The hub 146 has a lever arm 150 midway of its length extending axially rearward and two lever arms 152, one at each end extending transversely. The hub and the three arms are preferably integral.

Figures 7, 8, 9, 10, 11, 12, 13, 14, 15, 16, 17, 18:
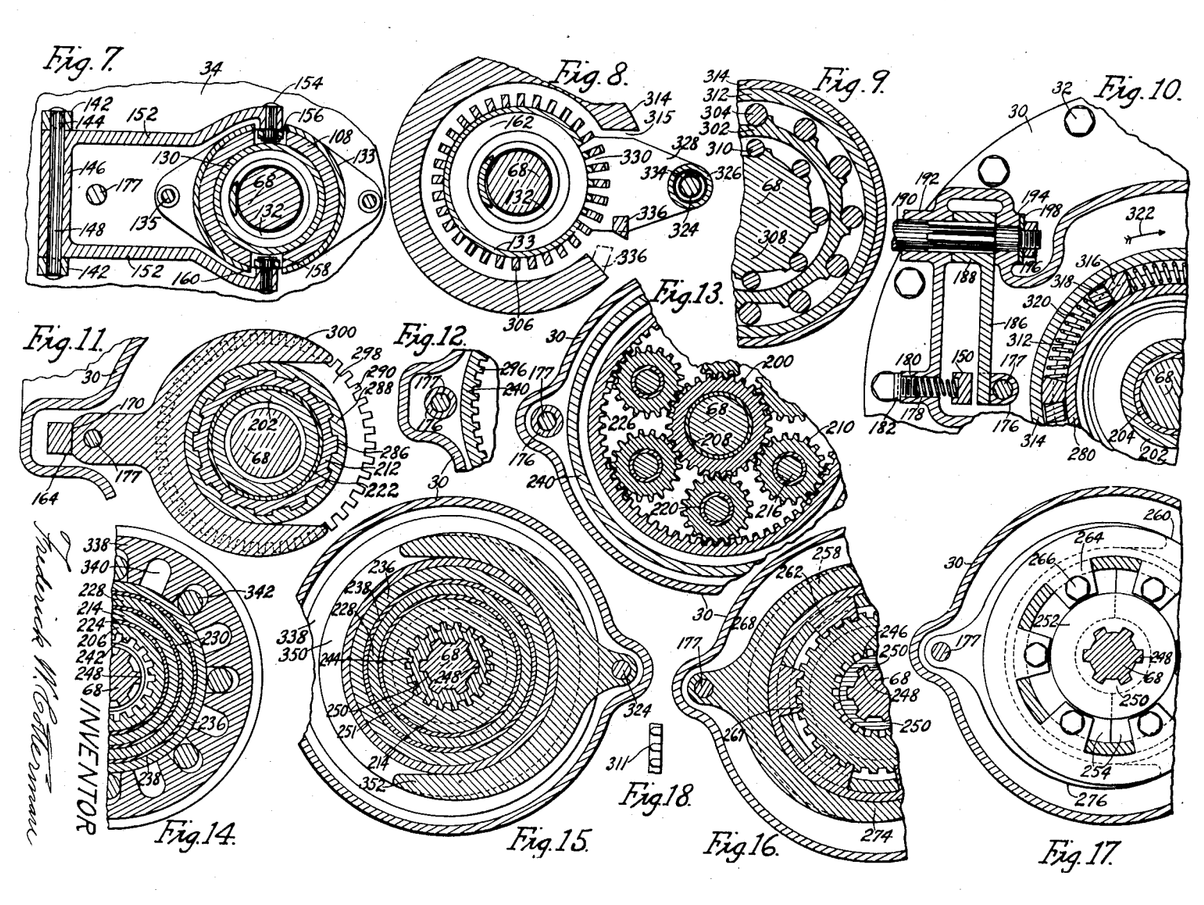
Fig. 7 is a fragmentary section taken at 7—7 of Fig. 1 through the rotor brake and another part of its operating mechanism.
Fig. 8 is a fragmentary section taken at 8—8 of Fig. 1 through the overdrive engaging mechanism.
Fig. 9 is a fragmentary section taken at 9—9 of Fig. 1 through the roller clutches which control the sun gear.
Fig. 10 is a fragmentary section taken at 10—10 of Fig. 1 through part of the manual control means and through a part of the overdrive operating mechanism.
Fig. 11 is a fragmentary section taken at 11—11 of Fig. 1 through a part of the manual control mechanism.
Fig. 12 is a fragmentary section taken at 12—12 of Fig. 1 through another part of the manual control mechanism.
Fig. 13 is a fragmentary section taken at 13—13 of Fig. 1 through the planetary gearing.
Fig. 14 is a fragmentary section taken at 14—14 of Fig. 1 through a part of the overdrive governor and a part of the manual control means.
Fig. 15 is a fragmentary section taken at 15—15 of Fig. 1 through another part of the overdrive governor and another part of the manual control means.
Fig. 16 is a fragmentary section taken at 16—16 of Fig. 1 through another part of the manual control means.
Fig. 17 is a fragmentary section taken at 17—17 of Fig. 1 showing a part of the manual control means in end view.

The arms 152 each carry a stud 154 and roller 156 at the free end. Slots 158 and 160 extend through the hub 108 and cup 133 respectively. The slots 158 and 160 are long and wide enough to allow the rollers to be moved freely forwardly and backwardly by swinging of the arms 152 about the hinge pin 148. A flange 162 extends outwardly from the brake cone 130. The flange 162 fits the inside of the cup 133 slidably.

The rollers 156 when in their normal unoperated position are slightly forward of the flange 162 so that the rollers must first operate rearwardly through about one-fourth their total movement before they engage the flange. The other three-fourths of their movement carries the flange rearwardly and disengages the brake cone.

At its rear end the axially extending arm 150 turns inwardly and has a cam end 164 fitted to the V notches 166, 168, 170, 172 and 174 in the shifting tube 176. The tube 176 is slidable forwardly and rearwardly on the shifting rod 177 to effect the several connections which are made manually. It is obvious that when the tube 176 is shifted, the rotor brake will be released for an instant each time the tube is shifted from any one of its positions to another. A spring 178 held in a hub 180 by the screw cap 182 keeps the cam 164 in the notches.

Forwardly of the V notches 166 to 174 in the shifting tube 176 is a rectangular notch into which the lower end of the lever 186 (see Fig. 10) extends for shifting the rod to its several positions. The lever has an internally splined hub 188 fitted over the externally splined shaft 190, the shaft having bearing in the hubs 192 and 194 formed in the rear housing section 30. A nut 196 and washer 198 holds the shaft in place. Any suitable control means such as a foot pedal or hand lever which will rotate the shaft 190 through a total of 30 degrees rotative movement will satisfactorily operate the manually shiftable mechanism.

Located centrally in the rear housing section 30 is a single planetary gear train with means adjacent to connect its several members variously to input, output and non-rotatable members so as to provide underdrive, direct drive, overdrive and reverse ratios with two neutral positions.

The sun gear 200 has a hub 202 provided with a bearing bushing 204, and a hub 206 provided with a bearing bushing 208. Bushings 204 and 208 are runningly fitted to the rotor shaft 68.

The planet pinions 210 are revolvably supported by a carrier comprising a front section 212 and a rear section 214 held together by studs 216. Studs 216 are riveted in the rear section 214 and held in the front section 212 by the nuts 218. The planet pinions 210 are provided with bearing bushings 220 which are runningly fitted to the studs 216. The front and rear carrier sections 212 and 214 are provided with bearing bushings 222 and 224 which are runningly fitted to the hubs 202 and 206 of the sun gear.

The ring gear 226 has a rearwardly extending hub 228 provided with a bearing bushing 230 which is runningly fitted to the rear carrier section 214. The planet pinions are in constant mesh with both the ring gear and the sun gear.

The output member or tail shaft 73 is rotatably supported in a ball bearing 234 secured to the tail shaft by a screw 231 acting through intermediate parts 233, 235, 237 and 239.

Tail shaft 73 has an enlarged tubular middle portion 236 rotatably supported by the bearing bushing 238 on the outside of the ring gear hub 228, and a front drum portion 240 which surrounds the ring gear. Thrust washers 241 and 243 separate the carrier, ring gear and tail shaft.

At first glance it would seem that the bearing bushings 230 and 238 are so large that the rubbing speed would be too high to be practicable, but it will later become evident that about seventy to eighty percent of driving will be done with no movement whatever between these bearings, and even when there is movement, both elements will revolve in the same direction but at slightly different speeds.

In overdrive, for instance, the carrier section 214 will revolve in the bushing 230, but the carrier section will be revolving slightly more than two-thirds as fast as the bushing, thus providing a rubbing speed equivalent only to a bearing having one-third the diameter of the carrier section 214 revolving at engine speed. It must also be remembered that the only load on these bearings is the weight of the several parts.

Internal clutch teeth 242, 244 and 246 are provided in the rear sun gear hub, the rear carrier section, and the ring gear hub respectively. The rotor shaft 68 is externally splined at 248 and an internally splined clutch member 250 is slidable axially on the shaft.

This clutch member has external teeth 251 on the front end only (see Fig. 15) which are normally in mesh with the internal teeth 244 of the rear carrier section 214, but are slidable forwardly or rearwardly to mesh with the teeth 242 of the sun gear (see Fig. 14) or the teeth 246 of the ring gear (see Fig. 16).

At the rear end the clutch member 250 is enlarged and provided with the groove 252 into which the washer 254 is runningly fitted. This washer is cut in halves (see Fig. 17) to permit assembly.

The tubular portion 236 of the tail shaft is cut through by six equally spaced slots 256. Shifting collars 258 and 260 have inwardly extending ears 262 and 264 respectively, the ears being slidably fitted to the slots. The inner ends of the ears 264 overlap the washer 254 and are secured thereto by the screws 266 (see Fig. 17).

The inner ends of the ears 262 are internally toothed at 267 to fit axially long external teeth 268 formed in the outside of the ring gear hub. (See Fig. 16.) Collars 258 and 260 are grooved at 270 and 272 for the shifting forks 274 and 276 which are carried on the shifting tube 176. Shifting the tube 176 to its most forward position will disconnect the rotor shaft from the carrier and connect it to the sun gear but will not disconnect the ring gear from the tail shaft, while shifting the tube to its most rearward position will disconnect the rotor shaft from the carrier and connect it to the ring gear and will at the same time disconnect the ring gear from the tail shaft.

The forward end of the sun gear hub 202 is supported by a ball bearing 278 held in the bearing holder 280 which is concentrically held against rotation in a recess in the housing section 30 by screws (not shown). A spring ring 282 holds the bearing 278 from moving rearwardly on the hub 202. A thrust washer 284 separates the ball bearing and front carrier section.

The front carrier section 212 has external splines 286. An internally splined clutch member 288 having external clutch teeth 290 and 292 is axially slidable on the carrier section.

The rearward face of the bearing holder 280 is provided with end clutch teeth 294 and the forward end of the tail shaft drum 240 is provided with internal clutch teeth 296. Teeth 294 and 296 are adapted to be engaged by the teeth 290 and 292 respectively. A groove 298 receives the shifting fork 300 carried by the shifting tube 176. Shifting the tube 176 to its most forward position will hold the carrier against rotation while shifting the tube to its most rearward position will connect the carrier to the tail shaft. All clutch teeth which must be meshed by relative axial movement are pointed on their engaging faces as at 311, Fig. 18, except that teeth 244 and 251 are thus beveled on both faces.

At its forward end the sun gear hub 202 is enlarged and formed to provide the cup 302 (see Fig. 9) which is round on the inside, shaped to hold the brake rollers 304 on the outside and provided with brake teeth 306 (see Fig. 8) on its front face.

The rotor shaft 68 is enlarged at 308 and shaped externally to hold the clutch rollers 310 (see Fig. 9). An outer brake ring 312 surrounds the brake rollers 304 closely enough to be engaged thereby.

The outer brake ring holder 314 is runningly fitted over the ring 312. Holder 314 is non-rotatably held in the same recess of the housing section 30 as the bearing holder 280 and by the same screws (not shown). From an inspection of Fig. 9 it will be obvious that the double roller clutch and brake structure will prevent the sun gear from rotating backwardly and also prevent it from rotating forwardly faster than the rotor shaft.

The outer roller brake ring 312 is not secured solidly in the holder 314 against backward rotation but is spring cushioned, so as to allow it to yield when the brake rollers 304 engage it and allow it to be turned backwardly through about fifteen degrees rotation. To provide this cushioning effect, integral lugs 316 (see Fig. 10) extend rearwardly from the rear face of the brake ring 312 and similar lugs 318 extend forwardly from the front side of the bearing holder 280, being riveted in the holder as at 319, Fig. 1. Springs 320 are placed between pairs of lugs as in Fig. 10, whereby the brake ring 312 is held in the position shown, but has limited rotation rearwardly in the direction of the arrow 322, Fig. 10, when its movable integral lugs 316 compress the springs 320 against the lugs 318.

Slidable endwise on the shifting rod 324 is the shifting tube 326 which, at its front end, carries the overdrive braking segment 328. The inner end (see Fig. 8) of the segment 328 is provided with braking teeth 330, the ends of which are axially slidable in slots 332 (see Fig. 1) cut in the cup 133 whereby the segment is prevented from rotating about the rod 324.

The remaining parts of the segment teeth 330 not in the slots 332 are adapted to be received by the spaces between end teeth 306 of the sun gear whenever the segment is allowed to move rearwardly by movement of the shifting tube 326 on the shifting rod 324. The hub of the segment is recessed to receive the spring 334 which at all times urges the segment axially rearward to engage its teeth 330 with the end teeth 306 of the sun gear.

The front face of the outer brake ring holder 314 is cut away as at 315, Fig. 8, to allow sufficient space for the segment to move axially rearward without striking the holder.

Extending integrally from the front face of the outer roller brake ring 312 is a locking lug 336 which is so positioned on the ring as to obstruct axial movement of the segment 328, (see Fig. 8), from the position shown. The lug 336, however, will always be removed from the obstructing position, Fig. 8, whenever the ring 312 is engaged by the rollers and rotated backwardly against the resistance of the springs 320. Whenever therefore, the outer roller brake becomes operative to resist rearward rotation of the sun gear, the obstructing lug is moved circumferentially from the position shown (see Fig. 8) to the dot and dash line position where it is stopped by contact with the edge of the cut away portion 315 of the brake ring holder 314. It follows that the spring 334 may move the segment 328 axially rearward into engaged position whenever the sun gear comes to a stop and starts to rotate backwardly, provided there is no other obstruction to rearward movement of the segment.

There is, however, another obstruction to rearward movement of the segment, this being provided by the overdrive governor which is located on the outside of the tubular portion 236 of the tail shaft, and comprises a large collar 338 shaped to fit up to and slightly over the rear face of the tail shaft drum 240.

The collar 338 has a series of half round grooves 340, (see Fig. 14), in its front face, the grooves preferably extending at an angle with the axis of about forty-five degrees. There are sixteen grooves and into eight of these are placed ground steel balls 342.

On the rear face, the collar 338 has a series of circular openings to receive one end of the springs 344. A smaller collar 346 having corresponding circular openings receives the other end of the springs 344. A spring ring 348 prevents the collar 346 moving rearwardly. The collar 338 is externally grooved at 350 to receive the shifting fork 352 carried on the shifting tube 354 which is slidable on the rod 324.

When, at a certain speed, the centrifugal force of the balls 342 overcomes the resistance of the springs 344 and the balls move out, the front end of the tube 354 moves away from the rear end of the tube 326. If, during the time that the balls 342 remain out, which will be as long as the vehicle moves above a predetermined speed, the outer roller brake acts to move the locking lug 336 from its obstructing to its non-obstructing position, the overdrive segment 328 will drop into place and hold the sun gear against forward rotation. This is the only connection which need be made to change from the direct drive connection shown to the overdrive connection.

Proportion

While the mechanism shown may be proportioned for use with any horsepower and vehicle weight within reason, some suggestion as to proportion for a given vehicle may preferably be given.

If the largest dimension of the housing 28 is taken as 15½″ and other parts made to the same scale, the mechanism will be suitable for an engine of around 120 H. P., in a vehicle of approximately 4000 pound weight.

The planetary gearing is 14 pitch; 20 degree pressure angle; 14 degree right hand helix angle. The ring gear has 63 teeth on a pitch diameter of 4.638″; the sun gear 27 teeth on a pitch diameter of 1.988″; and the planet pinions 18 teeth on a pitch diameter of 1.325″.

The underdrive ratio, provided by making the ring gear the driver, the planet pinion carrier the driven, and the sun gear the non-rotative or reacting member will then be $$\frac{R+S}{R}=\frac{63+27}{63}=\frac{90}{63}=1\tfrac{3}{7}$$

rotor shaft revolutions to 1 tail shaft revolution.

The overdrive ratio, provided by making the planet pinion carrier the driver, the ring gear the driven, and the sun gear the reacting member will be $$\frac{R}{R+S}=\frac{63}{90}=\tfrac{7}{10}$$

rotor shaft revolution to 1 tail shaft revolution.

The reverse ratio, provided by making the sun gear the driver, the ring gear the driven, and the planet pinion carrier the reacting member will be $$\frac{R}{S}=\frac{63}{27}=\frac{7}{3}=2\tfrac{1}{3}$$

rotor shaft revolutions forwardly to 1 tail shaft revolution backwardly.

Using a 4⅓ to 1 rear axle (one of the standards) and vehicle resistance sufficient to pull the hydraulic unit down to a ratio of 2 impeller revolutions to 1 rotor revolution, which is within its efficient range as a torque converter, the overall engine-to-wheel ratio through underdrive would be $$2\times10/7\times13/3=12.38;$$

through direct drive $$2\times1\times13/3=8.66;$$

through overdrive $$2\times7/10\times13/3=6.06;$$

through reverse $$2\times7/3\times13/3=20.2.$$

The above are the ratios when the torque converter unit is pulled down to a 2 to 1 impeller-to-rotor ratio, but with either of the ratios in effect the torque converter will gradually, as the engine is able to increase its speed under the load imposed, change from 2 to 1 to 1 to 1, whereupon the engine-to-wheel ratios will be for underdrive 6.19 to 1; for direct 4.33 to 1; for overdrive 3.03 to 1; and for reverse 10.1 to 1.

The range of engine-to-wheel ratio change may therefore be somewhere between 12.38 to 1 and 3.03 to 1 depending on what the then existing load and speed balance has made the torque converter ratio. Similarly the reverse ratio may be anything between 20.2 to 1 to 10.1 to 1 depending on the resistance encountered.

In the hydraulic unit, the centrifugal weights 104, and the springs 88 and 132 are so proportioned that the weights fly out and open the impeller valves and release the rotor brake at about 600 engine R. P. M. This may of course be varied to suit individual engines.

In the gear box, the centrifugal weights 342 and their restraining springs 344 are preferably so proportioned that the weights will move to connect for overdrive ratio at around 50 m. p. h. However, since the rear axle ratio must be varied somewhat from the 4⅓ to 1 value given, becoming greater as the vehicle weight is greater and the engine power less, so the overdrive ratio may profitably be varied, that is, to come in at a lower speed if the proportion of engine power to vehicle weight justifies with the axle ratio selected. Extra balls 342 may be added for this purpose.

Operation

The normal condition of the mechanism, that is, the condition which exists when the engine is at rest or operating below 600 R. P. M., is that shown in the drawings, where the centrifugal weights 104 of the hydraulic unit are in their "in" position and the rotor brake 130 is applied, and where the gear mechanism is coupled for direct drive, that is, for connection between the rotor shaft and tail shaft which compels them to revolve at the same speed.

The reason the gearing, connected as shown, operates as a direct connection between the rotor shaft and tail shaft is that the carrier, being connected to the rotor shaft, and the ring gear to the tail shaft, application of power to the carrier and resistance by the tail shaft will spin the sun gear forwardly at $$\frac{R+S}{S}$$

or 3.33 times engine speed. It follows that any means which will hold the sun gear from rotating forwardly faster than the rotor shaft will provide direct drive.

The small roller clutch of the roller clutch and brake device shown and described performs this function. It is required to hold in foot pounds only 1/3.33 or less than ⅓ engine torque.

The greater percentage of all forward driving will be done with the gear mechanism in direct drive as shown. If, for instance, a driver is starting the vehicle on a substantially level road and is content with good, but not maximum acceleration, he need only depress the engine accelerator whereupon the engine will first increase to 600 R. P. M., open the impeller valves and release the rotor brake, thereby driving the rotor at a less speed and greater torque than the engine.

A hydraulic torque converter similar to that herein shown has already been developed by others to a degree which provides torque multiplication somewhat better than is had with the second gear of a conventional gear box.

Inasmuch as many drivers of conventional vehicles start from a dead stop in second gear, such drivers at least would be satisfied with the acceleration obtainable through the hydraulic unit herein shown without further torque multiplication through the gear mechanism. Other driving conditions, however, require the use of the gearing, as for instance, where the driver has started the engine in the usual manner and it is cold, and he desires to speed up the engine beyond 600 R. P. M. to warm it without driving the vehicle.

In this case he may move the shifting tube 176 to bring the cam 164 into either the notch 168 or 172 in either of which the rotor shaft is entirely free of the gearing because the teeth 251 of the clutch member 250 will be midway of the engaged positions. In this neutral position the engine may be speeded up and warmed.

Assuming that the driver next desires to back the vehicle. To do this he first lowers the engine R. P. M. to idling speed by releasing the accelerator pedal, then moves the shifting tube 176 forwardly until the cam 164 drops into the notch 174. This connects the sun gear to the rotor shaft through teeth 251 and 242 and holds the carrier non-rotative by connection of the teeth 290 with 294. The teeth 267 have moved forwardly in the teeth 268 but have not altered their connecting status. The gearing is therefore in reverse. The roller brake merely overruns and the roller clutch is inoperative because its driving and driven elements are connected by the teeth 251 and 242 to revolve at the same speed.

Assuming the driver next wishes to use underdrive to move the vehicle forward with maximum acceleration. For making underdrive connection he moves the shifting tube 176 rearwardly until the cam 164 drops into the notch 166. This movement disengages the teeth 267 from 268 thereby releasing the ring gear from the tail shaft; it engages the teeth 251 with 246 thereby connecting the ring gear to the rotor shaft; and it engages the teeth 292 and 296 thereby connecting the carrier to the tail shaft.

When under this condition power is applied to the rotor shaft to rotate the ring gear, the resistance of the tail shaft connected carrier causes the sun gear to attempt to spin rearwardly at $$\frac{R}{S}$$

or 2.66 times engine speed. It follows that any means which will hold the sun gear from rotating backwardly will provide underdrive. The roller brake performs this function. It is required to hold in foot pounds only 1/2.66 or less than 45% of the engine torque.

Shifting from underdrive back to direct will be accomplished as in any sliding gear transmission, that is, the accelerator is first released long enough to allow the engine speed to be reduced, relative to the vehicle speed, an amount corresponding to the difference between the ratio being shifted out of and that being shifted into, then the shift is made.

It is the intention however, that the underdrive ratio be used only in rare cases, such, for instance, as in conjested areas and when a complete stop must be made when ascending a steep hill. A further use for the underdrive may occur on mountainous roads where long continued speed reduction through the hydraulic unit might unduly overheat the fluid.

The infrequent necessity for the underdrive is the reason for not making its operation automatic, as in that case the vehicle would have to be started each time through the underdrive whether driving conditions required it or not.

It will be obvious that the manual shifting of the toothed members will be made easily because, if the vehicle is at rest so that the rotor brake is applied, it will be released for an instant by movement of the cam 164 each time a shift from one position to the next occurs. This will release the rotor just long enough for it to start turning, and therefore just long enough to let the rotor shaft clutch member teeth 251 start to enter the teeth with which they are trying to mesh.

The teeth 251 and mating teeth 242, 244 and 246 are wider than the others so that they will start to engage slightly ahead of the others. No matter therefore, how the teeth are aligned when a shift is attempted, the turning of the rotor shaft and the touching by teeth 251 of any of its mating teeth 242, 244 or 246 will cause relative rotation between the other teeth which must be engaged and permit their entry. It will of course be understood that the rotor movement, attainable from the time it is released by the brake and the time the teeth being engaged are fully meshed and the brake reapplied, is very slight.

The overdrive connection will be made automatically whenever the accelerator is released if the vehicle is moving faster than 50 m. p. h. The operation of shifting up to overdrive is as follows:

The connections shown in the drawing provide direct drive only because the sun gear is restrained from rotation forward faster than the rotor shaft. The only act necessary to change the connection shown to overdrive is to hold the sun gear against its effort to rotate forwardly so that it may not rotate at all.

At 50 m. p. h., the governor balls 342 overcome the springs 344 and move out. This shifts the tube 354 rearwardly and creates a gap between the forward end of the tube 354 and the rearward end of the tube 326.

After this governor function is performed the driver may continue on in direct drive as long as he doesn't let the vehicle drive the engine. If, however, he allows the vehicle to drive the engine, the sun gear, which was trying to rotate forwardly, now suddenly tries to rotate backwardly.

When the sun gear tries to rotate backwardly, it moves the lock lug 336 circumferentially against the resistance of springs 320 from the position shown to the dot and dash position Fig. 8, and thereby gets it away from in front of the segment 328, whereupon the segment is forced by the spring 334 to engage its teeth 330 with the end teeth 306 of the sun gear thereby holding the sun gear against forward rotation and making the overdrive connection. These teeth will engage without clash because they are not permitted to attempt engagement until the sun gear comes to rest and starts backwardly. A complete release of the accelerator pedal at a speed of above 50 m. p. h., will change from direct to overdrive in about one second.

Due to the friction of the various parts involved and the fact that the governor balls 342 are farther from the axis in overdrive than in direct, the springs 344 do not have force enough to move the balls back in until the speed drops to about 40 m. p. h.

Even then it is necessary that the strain be taken off of the sun gear momentarily to permit the segment teeth to slide out of engagement with the sun gear teeth. As soon as they slide out and the vehicle ceases driving the engine, as when power is reapplied, the locking lug 336 moves around and again holds the segment in the direct drive position shown.

In conventional automotive transmissions, each time there is a sudden need for more power to meet some driving condition, something has to be shifted, but, with the combination of hydraulic torque converter and gear set shown, a step down equal to at least one speed ratio may always be had through the hydraulic unit by mere application of more engine torque.

Assuming, for instance, the vehicle is being driven in highly congested traffic and is therefore set in underdrive, which it is contemplated will seldom be necessary, the vehicle, when the application of power is moderate, will be operating through an engine-to-wheel ratio of around 6 to 1, but if for the purpose of rapid acceleration, full power is suddenly applied, the torque converter's operation may change this ratio to as much as 12 to 1 engine-to-wheel ratio. In such a case no gear shifting is necessary or desirable.

In all other driving except underdrive and reverse the gear set should be left in its normal direct connected position shown.

In non-congested areas in a city this direct drive will probably remain in effect because it provides an overall ratio of 4⅓ to 1, which is one standard for direct, but if a stop is made, or if sudden need of power arises, the application of full engine power may provide, through the hydraulic unit an engine-to-wheel ratio of as much as 8.66 to 1 which is better than conventional second gear for starting.

On the open highway the overdrive ratio of 3.03 to 1 will automatically come in as explained, and is preferably used as soon as available, but should a need for more power arise, as after having slowed down to 50 m. p. h., to go around a curve and quick acceleration back to 75 or 80 m. p. h., is desired, the application of full power may, through the hydraulic unit change the 3.03 to 1 overdrive ratio to a ratio equal to or better for acceleration than would a shift down of one speed in a conventional gear-set.

Of course there comes a speed at which the hydraulic unit ceases providing speed reduction and becomes a direct driving clutch. When the gear-set is connected for underdrive this will occur at about 30 m. p. h. When it is in direct it will occur at about 42 m. p. h., and when in overdrive at about 60 m. p. h.

The no-back feature of the device is inherent. When in direct drive as shown in the drawings, rotation of the tail shaft backwardly one turn would rotate the sun gear forwardly 2⅓ turns if the carrier remained non-rotative, but the carrier is now secured to the rotor shaft, therefore if the carrier is to remain non-rotative the rotor shaft must remain non-rotative, but if the rotor shaft remains non-rotative the sun gear cannot rotate forwardly because of the roller clutch. The tail shaft is therefore locked against rearward rotation when in direct drive.

In underdrive, rotation of the tail shaft backwardly turns the carrier backwardly because in underdrive these members are secured together. The sun gear cannot rotate backwardly because of the roller brake, so the ring gear must rotate backwardly 10/7 turn to one of the tail shaft. But the ring gear, in underdrive, is secured to the rotor shaft, so if the ring gear must rotate backwardly 10/7 turn so must the rotor shaft, but the rotor shaft cannot rotate backwardly because of the roller clutch. There is therefore no backward rotation in underdrive.

In overdrive the sun gear is held against rotation in either direction so that if the tail shaft is to rotate backwardly one turn, the carrier must rotate backwardly 7/10 turn taking the rotor shaft with it, but the rotor shaft cannot rotate backwardly with it because of the roller clutch. There is therefore no backward rotation in overdrive.

In reverse, the sun gear is secured to the rotor shaft and rotates forwardly. The roller brake cannot interfere. The carrier is held non-rotative and the tail shaft rotates backwardly. Reverse is the only connection wherein the tail shaft may rotate backwardly.

I claim—

1. Hydromechanical power transmitting mechanism comprising, in combination, an impeller, a rotor, a tail shaft, gearing for connecting the rotor and tail shaft, toothed parts on said rotor, tailshaft and gearing engageable one with another to connect said rotor and tail shaft in different ways through said gearing to provide different ratios, manual means for engaging said toothed parts one with another to shift from one ratio to another, a brake for holding the rotor non-rotative, and means operative by said manual ratio shifting means to release said brake momentarily when shifting out of one ratio into another.

2. Hydromechanical power transmitting mechanism comprising, in combination, an impeller, a rotor, a tail shaft, gearing for connecting the rotor and tail shaft, toothed parts associated with said rotor, tail shaft and gearing engageable one with another to connect said rotor and tail shaft in different ways through said gearing to provide different ratios, a brake for holding said rotor non-rotative, and a single manual means movable to disengage one set and engage another set of said toothed parts and thereby change from one ratio to another and simultaneously release and reapply said brake.

3. Hydromechanical power transmitting mechanism comprising, in combination, an impeller, a rotor, a tail shaft, gearing for connecting the rotor and tail shaft, toothed clutch members on said gearing for connecting said rotor and tail shaft through said gearing in different ratios, a movable toothed clutch member on said rotor engageable with one or another of the first said toothed clutch members, a brake for holding said rotor non-rotative, and manual means operative to move said movable clutch member out of engagement with one of the first said clutch members and simultaneously release said brake, and reengage it with another of the first said clutch members and simultaneously reapply said brake.

4. Hydromechanical power transmitting mechanism comprising, in combination, an impeller, a rotor, a tail shaft, gearing for connecting the rotor and tail shaft, a plurality of toothed members, associated with said rotor, tail shaft and gearing, one being a movable toothed member engageable with the other said toothed members for connecting said gearing in different ratios, a brake for holding said rotor non-rotative, centrifugal means for holding said brake disengaged when said impeller revolves above a predetermined speed, and manual means adapted when operated below said predetermined speed to release and reapply said brake as the movable toothed member is disengaged from one and engaged with another of the other said toothed members.

5. Hydromechanical power transmitting mechanism comprising, in combination, an impeller, a rotor, a tail shaft, gearing for connecting the rotor and tail shaft, a plurality of toothed members on said rotor, tail shaft and gearing, one being a movable toothed member engageable with the other said toothed members for connecting said gearing in different ratios, a brake for holding said rotor non-rotative, valve means carried by the impeller for closing the spaces between the impeller blades to lessen its force to drive the rotor, means operatively connecting said valves and brake, centrifugal means for operating and connecting means thereby simultaneously opening said valves and disengaging said brake at a predetermined speed, and manual means adapted when operated below said predetermined speed to release and reapply said brake and simultaneously disengage the movable toothed member from one and engage it with another of the other said toothed members.

6. Transmission gearing comprising, a sun gear, planet pinions in mesh with said sun gear, a second gear in mesh with said planet pinions, a planet pinion carrier, an input member, an output member, a non-rotatable member, means to connect the said second gear to the input member, means to connect the said second gear to the output member, means to connect said carrier to the input member, means to connect said carrier to the output member or the non-rotatable member, means to connect said sun gear to the input member, means to connect said sun gear to the non-rotatable member, and mechanism which prevents said sun gear from revolving backwardly but allows it to revolve forwardly as fast but no faster than the input member.

7. Transmission gearing comprising, a sun gear, planet pinions in mesh with said sun gear, a second gear in mesh with said planet pinions, a planet pinion carrier, an input member, an output member, a non-rotatable member, overrunning means to prevent the sun gear rotating backwardly and overrunning means to prevent it rotating forwardly faster than the input member, means to optionally connect the input member to either the sun gear, the carrier, or the second gear, means to optionally connect the output member to either the second gear or to the carrier, means to connect the carrier to the non-rotatable member, and means to hold the sun gear against forward rotation.

8. Transmission gearing comprising, a sun gear, planet pinions in mesh with said sun gear, a ring gear in mesh with said planet pinions, a planet pinion carrier, an input member, an output member, a non-rotatable member, a one way brake adapted to connect the sun gear to the non-rotatable member to prevent the sun gear rotating backwardly, a one way clutch adapted to connect the sun gear to the input member to prevent it revolving forwardly faster than the input member, means for selectively connecting the input member to either the sun gear, the carrier or to the ring gear, means for selectively connecting the output member to either the ring gear or the carrier, means for connecting said carrier to said non-rotatable member, and means for holding said sun gear against forward rotation.

9. Transmission gearing comprising, a sun gear, planet pinions in mesh with said sun gear, a second gear in mesh with said planet pinions, a planet pinion carrier, an input member, an output member, a non-rotatable member, manual means for connecting the input member and sun gear, the input member and carrier, the input member and second gear, the output member and carrier, the output member and second gear, the carrier and stationary member, overrunning means to prevent the sun gear rotating backwardly, overrunning means to prevent the sun gear from rotating forwardly faster than the input member, and means to positively hold the sun gear against forward rotation.

10. Transmission gearing comprising, a sun gear, planet pinions in mesh with said sun gear, a second gear in mesh with said planet pinions, a planet pinion carrier, an input member, an output member, a non-rotatable member, manual means operable to three connecting positions, the one position connecting the input member to the carrier and the output member to the second gear, the second position connecting the input member to the sun gear, the output member to the second gear and the carrier to the non-rotatable member, and the third position connecting the input member to the second gear and the output member to the carrier, means for holding the sun gear from rotating backwards, means for holding the sun gear from rotating forwards faster than the input member, and means for holding the sun gear fom rotating forwards.

11. Transmission gearing comprising, a sun gear, planet pinions in mesh with said sun gear, a ring gear in mesh with said planet pinions, a planet pinion carrier, an input member, an output member, a non-rotatable member, a combination of means for connecting the input and output members in direct drive relation comprising means for connecting the carrier to the input member, the ring gear to the output member and restraining the sun gear from revolving forwardly faster than the input member, means for changing the direct drive to an overdrive connection comprising means for arresting the forward rotation of the sun gear, a combination of means for effecting an underdrive connection comprising means for connecting the ring gear to the input member, the carrier to the output member and restraining the sun gear against backward rotation, and a combination of means for effecting a reverse connection comprising means for connecting the sun gear to the input member, the aforesaid means for connecting the ring gear to the output member and a means for connecting the carrier to the non-rotatable member.

12. The structure defined in claim 11 wherein the two way clutch means are engageable manually and the means for arresting the forward rotation of the sun gear is effected automatically.

13. The structure defined in claim 11 with a manual means operable to three positions to effect the direct drive, the underdrive and the reverse combinations of connecting means and a centrifugal governor operable at a predetermined speed to make the change from direct to overdrive connection.

14. Transmission gearing comprising, a sun gear, planet pinions in mesh with said sun gear, a ring gear in mesh with said planet pinions, a planet pinion carrier, an input member, an output member, a non-rotatable member, a combination of means for connecting the input and output members in direct drive relation comprising two way clutch means for connecting the carrier to the input member, two way clutch means for connecting the ring gear to the output member and one way clutch means for restraining the sun gear from revolving faster than the input member, means for changing the direct drive to an overdrive connection comprising means for arresting the forward rotation of the sun gear, a combination of means for effecting an underdrive connection comprising two way clutch means for connecting the ring gear to the input member, two way clutch means for connecting the carrier to the output member and one way brake means for holding the sun gear against backward rotation, and a combination of means for effecting a reverse connection comprising two way clutch means for connecting the sun gear to the input member, the aforesaid two way clutch means for connecting the ring gear to the output member, and a means for connecting the carrier to the non-rotatable member.

15. Transmission gearing comprising, an input member, an output member, a planet pinion carrier secured to the input member to rotate therewith, planet pinions on said carrier, a ring gear in mesh with said planet pinions secured to the output member to rotate therewith, a one way clutch adapted to restrain the sun gear from rotating forwardly faster than the input member, a one way brake adapted to restrain the sun gear against backward rotation, a non-rotatable brake means, brake means on said sun gear engageable with said non-rotatable brake means, a speed responsive device operative at a predetermined speed to effect connection of said sun gear brake means with said non-rotatable brake means, locking means to oppose the effecting of said connection by said speed responsive means, said locking means being adapted to be overcome by backward movement of said sun gear acting through the second one way brake.

16. The structure defined in claim 15 wherein the said one way brake comprises yieldable means whereby the sun gear may rotate backwardly a small part of a revolution after said brake takes hold, and the locking means is unlocked by said small part of a revolution.

17. The structure defined in claim 15 wherein the said one way brake comprises a sun gear brake element and a substantially non-rotatable brake element supported for limited rotation in a non-rotatable holder, with resilient means resisting said limited rotation, and the locking means is adapted to be moved to unlocked position by said limited rotation.

18. The structure defined in claim 15 wherein one element of said one way brake is on the sun gear and the other on a ring, the said ring being supported for limited rotation in a non-rotatable holder with yielding means adapted to oppose said limited rotation, and the locking means being carried on said ring and interposed to hold the non-rotatable brake means from the sun gear brake means, said locking means being so positioned on said ring as to be moved circumferentially out of its obstructing position to a non-obstructing position by said limited rotation.

19. In transmission gearing comprising, a sun gear, planet pinions in mesh with said sun gear, a ring gear in mesh with said planet pinions, a planet pinion carrier, an input member, an output member, a non-rotatable member, and means for effecting a direct drive connection from the input to the output member through said gearing comprising means connecting the carrier to the input member, means connecting the ring gear to the output member and a one way clutch holding the sun gear from rotating forwardly faster than the input member, mechanism for changing said direct drive connection to an overdrive connection comprising a one way brake adapted to restrain backward rotation of said sun gear, brake means on the sun gear, and non-rotatable brake means adapted to be moved into engagement therewith, resilient means for moving said non-rotatable brake means into engagement, speed responsive means adapted to oppose said resilient means up to a predetermined speed, locking means adapted to oppose said resilient means, and means associated with said one way brake operative when it resists backward rotation of said sun gear to release said locking means.

20. In transmission gearing, an input member, an output member, a non-rotatable member, a sun gear, planet pinions in mesh with the sun gear, a ring gear in mesh with the planet pinions, a planet pinion carrier, and means between the input and output members, operable to provide a direct drive connection connecting the carrier and the sun gear to revolve with the input member and the ring gear with the output member, a reverse connection connecting the sun gear to revolve with the input member, the ring gear with the output member and the carrier to the non-rotatable member, an underdrive connection connecting the ring gear to the input member, the carrier to the output member and the sun gear to the non-rotatable member, and an overdrive connection connecting the carrier to the input member, the ring gear to the output member and the sun gear to the non-rotatable member.

FREDERICK W. COTTERMAN.